(12) United States Patent
Chopra et al.

(10) Patent No.: US 8,908,690 B2
(45) Date of Patent: Dec. 9, 2014

(54) ADDRESSING A WORKLOAD PARTITION

(75) Inventors: Chandan Chopra, Bangalore (IN);
Prashant Anant Paranjape, Bangalore (IN); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 13/454,347

(22) Filed: Apr. 24, 2012

(65) Prior Publication Data

US 2012/0207166 A1    Aug. 16, 2012

Related U.S. Application Data

(63) Continuation of application No. 12/762,141, filed on Apr. 16, 2010.

(51) Int. Cl.
| | | |
|---|---|---|
| H04L 12/28 | (2006.01) |
| H04L 12/56 | (2006.01) |
| G06F 15/167 | (2006.01) |
| G06F 15/16 | (2006.01) |
| G06F 9/455 | (2006.01) |

(52) U.S. Cl.
CPC .. G06F 9/45558 (2013.01); *G06F 2009/45595* (2013.01)
USPC ........... 370/392; 370/393; 370/394; 709/212; 709/228; 709/230; 709/245

(58) Field of Classification Search
None
See application file for complete search history.

(56) References Cited

U.S. PATENT DOCUMENTS

| | | | |
|---|---|---|---|
| 5,459,721 A * | 10/1995 | Yoshida | 370/392 |
| 2007/0233897 A1* | 10/2007 | Craft et al. | 709/238 |
| 2008/0267193 A1 | 10/2008 | Fought et al. | |
| 2009/0037718 A1 | 2/2009 | Ganesh et al. | |
| 2011/0258636 A1* | 10/2011 | Chopra et al. | 719/313 |

* cited by examiner

*Primary Examiner* — Hassan Phillips
*Assistant Examiner* — Lonnie Sweet
(74) *Attorney, Agent, or Firm* — Garg Law Firm, PLLC; Rakesh Garg; Damion Josephs

(57) ABSTRACT

A method for addressing a workload partition is provided in the illustrative embodiments. A packet of data directed to the WPAR and including a combined address is received at a software stack. A determination is made whether the combined address includes an identifier that is reserved. If the identifier is not reserved, the identifier is used to identify the WPAR in the data processing system and the packet is sent to the WPAR. The software stack is an application configured to enable data communication using a protocol of the packet, and is modified to detect, recognize, and process the combined address for routing the packet to the WPAR. The combined address may be logically formed using an identifier associated with the data processing system and an identifier associated with the WPAR, which may be located in different portions of the packet.

15 Claims, 8 Drawing Sheets

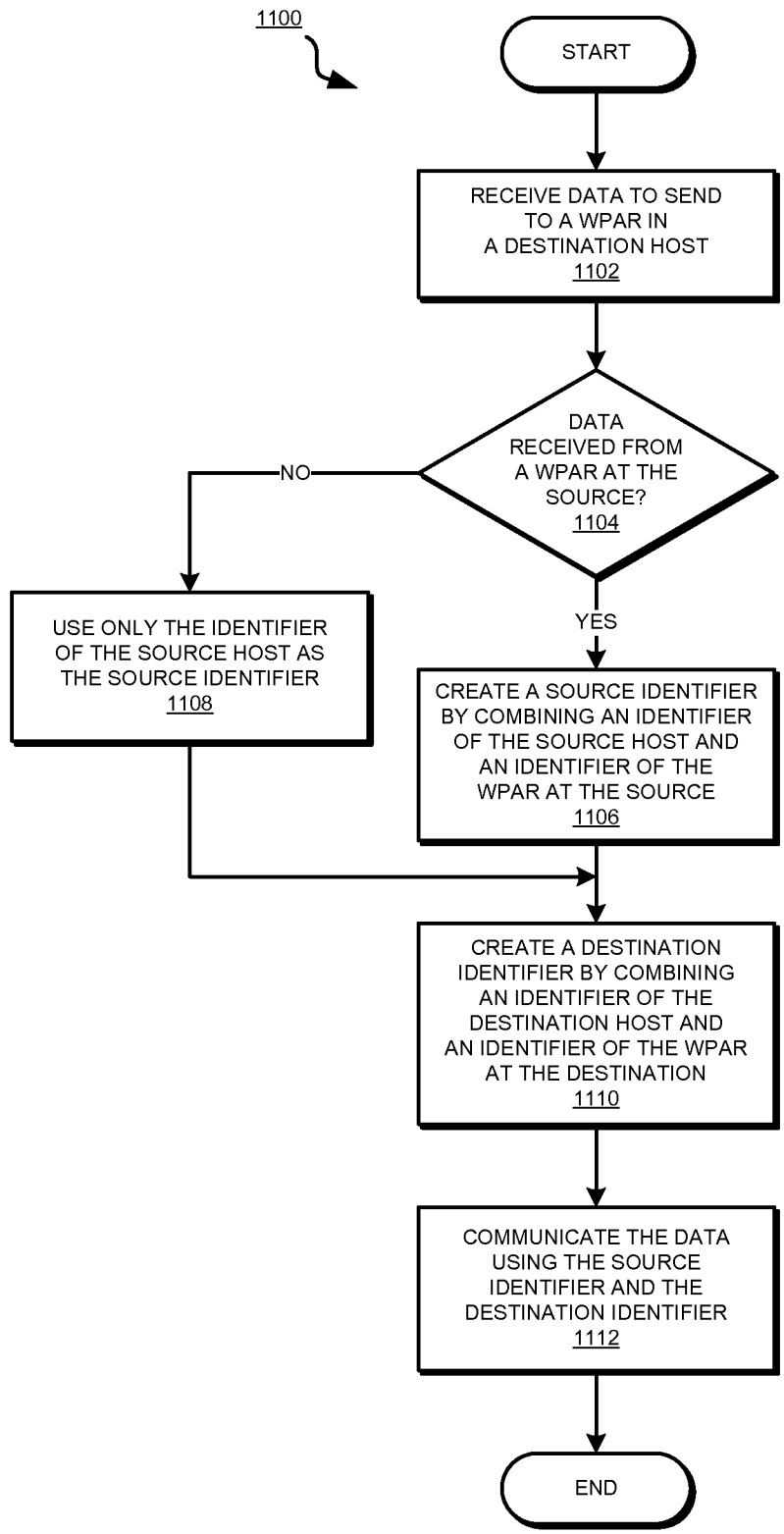

ADDRESSING A WORKLOAD PARTITION

BACKGROUND OF THE INVENTION

1. Field of the Invention

The present invention relates generally to an improved data processing system, and in particular, to a computer implemented method for operating partitions in a data processing environment. Still more particularly, the present invention relates to a computer implemented method for addressing a workload partition.

2. Description of the Related Art

Workload partition is a technology that allows separating users and applications by employing software techniques instead of forming separate hardware partitions. In other words, a data processing system can be so configured as to allow one or more virtual partitions to operate within the data processing system's operating system. Such a virtual partition is called a workload partition, or WPAR.

A WPAR shares the operating system and resources of the host data processing system. Resources accessible to the operating system of the host data processing system are said to belong to a "global space". In other words, a resource in the global space can be accessed by the operating system of the host data processing system.

An application executing in a WPAR may use the WPAR as if the WPAR were a complete data processing system. The application executes in the WPAR without the awareness that the WPAR, and consequently the application, is sharing resources in the global space of the host data processing system. More than one WPAR may share resources in the global space.

A WPAR is configured, started, operated, and eventually terminated in a host data processing system using resources in the global space. Resources utilized by the WPAR during these various stages remain visible, available, and accessible to the operating system of the host data processing system.

WPARs are commonly employed for separating applications, functions, or functionalities from one another. The separation may be desirable for a variety of reasons, such as security, performance, portability, or administrative concerns.

For example, a desirable feature of a banking application may be to separate the back-office functions from the web-user functions. Such a separation may be achieved by implementing the back-office functions and the web-user functions in a manner that they can be executed on different WPARs.

A WPAR can be addressed over a network just like a complete stand-alone data processing system. In other words, each WPAR in a host data processing system and the host data processing system itself can have unique network address. Thus, a host data processing system with several WPARs configured thereon appears as a collection of network addresses on a network as if a distinct data processing system is associated with each address.

SUMMARY OF THE INVENTION

The illustrative embodiments provide a method for addressing a workload partition. An embodiment receives a packet of data at a software stack executing in a data processing system, the packet being directed to the WPAR executing in the data processing system, the packet including a combined address. The embodiment determines whether the combined address includes an identifier that is reserved. The embodiment, responsive to the identifier not being reserved, uses the identifier to identify the WPAR in the data processing system. The embodiment sends the packet to the WPAR.

In another embodiment, the software stack is an application configured to enable data communication using a protocol of the packet. The software stack is modified to detect, recognize, and process the combined address for routing the packet to the WPAR.

In another embodiment, the combined address includes an identifier associated with the data processing system, and an identifier associated with the WPAR.

In another embodiment, the combined address further includes a delimiter. The delimiter separates the identifier associated with the data processing system from the identifier associated with the WPAR.

In another embodiment, the delimiter does not have a predefined significance in a protocol of the packet. The combined address is not stored in the combined form but is logically formed by combining the identifier associated with the data processing system located in a first portion of the packet and the identifier associated with the WPAR located in a second portion of the packet.

Another embodiment further identifies a presence of the combined address by checking an attribute in the packet.

In another embodiment, the attribute is a type of a destination option header option of the packet and a value of the attribute is unused in a protocol of the packet.

In another embodiment, the attribute is a type of a destination option header option of the packet. A value of the attribute is defined for a particular use in a protocol of the packet but is repurposed for identifying the presence of the combined address.

Another embodiment further performs a function corresponding to the identifier if the identifier is reserved.

In another embodiment, the function is broadcasting the packet to all WPARs executing in the data processing system.

In another embodiment, the packet does not include a combined address. The embodiment further processes the packet according to a protocol of the packet.

In another embodiment, a determination that the packet does not include a combined address is made by determining that the packet does not include a type attribute whose value indicates a presence of an identifier usable to identify the WPAR.

One embodiment for addressing a workload partition receives data at a software stack executing in a first data processing system. The embodiment creates a packet using the data, the packet being directed to the WPAR executing in a second data processing system. The embodiment creates a combined address to include in the packet. The embodiment sends the packet to the WPAR.

In another embodiment, the combined address includes an identifier associated with the data processing system, and an identifier associated with the WPAR. The identifier associated with the data processing system and the identifier associated with the WPAR are located in different portions of the packet.

Another embodiment further determines whether a predetermined function is to be performed at the second data processing system. The embodiment, responsive to the determining being affirmative, forms the combined address by storing an identifier associated with the data processing system and a reserved identifier corresponding to the function in the packet.

Another embodiment further places a part of the combined address in a destination option header of the packet and sets a type attribute to a value. The value causes a software stack at the second data processing system to discover the part of the combined address and route the packet to the WPAR.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 11 depicts a flowchart of another process of addressing a WPAR using a combined address in accordance with an illustrative embodiment.

DETAILED DESCRIPTION OF THE PREFERRED EMBODIMENT

Figure 1:
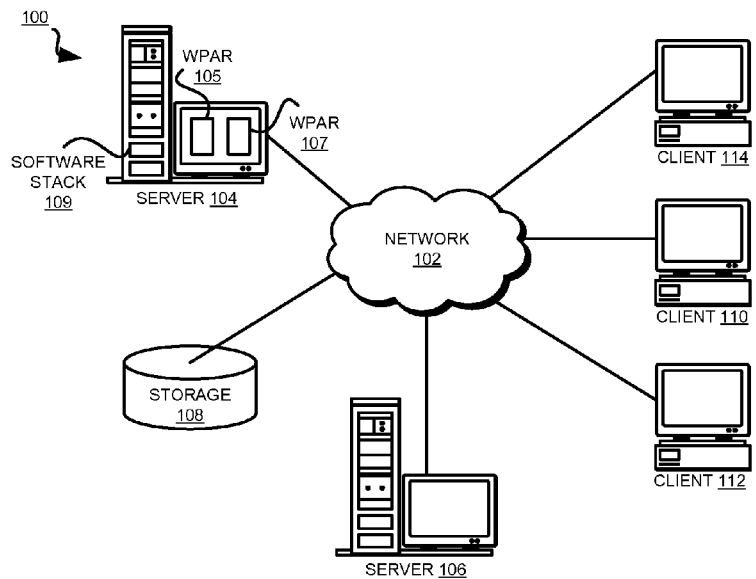
FIG. 1 depicts a pictorial representation of a network of data processing systems in which illustrative embodiments may be implemented.

The network connection for a WPAR is implemented using the network alias feature on the global space's physical or virtual network interface. Network aliasing is a process of adding more than one address to a network interface. The network alias feature allows a WPAR to appear as a data processing system on the network distinct from the host data processing system. Each WPAR executing on the host data processing system can similarly appear as a distinct data processing system on the network.

The network alias feature implements an Internet Protocol (IP) address for each WPAR in this manner, allowing a WPAR to be relocated to a different host data processing system. In practice, creating an alias for a network interface results in creating a new entry associated with netmask and broadcast masks for the physical interface.

The invention recognizes that representing a WPAR on a network in this manner poses several problems. For example, a license manager may associate a software license with a device or system at a particular address, such as the host data processing system at the host data processing system's IP address. When a WPAR executing on the host data processing system attempts to use the license, the license manager may deny the WPAR access to the software because the WPAR appears to be a system at a different address.

As another example, the invention recognizes that using network aliasing for WPARs, as is the present method, a network topology may appear more complex that it really is. The complexity appears to increase because where only one actual data processing system—the host data processing system—should be represented in the topology, a mix of several data processing systems appears in the topology such that the data processing system of the host is difficult to distinguish from the several WPARs. The invention recognizes that the increased complexity of the network topology makes network management and administration much more difficult than necessary.

Furthermore, in a given network, multiple host systems may each host multiple WPARs. The invention recognizes that the complex network topology makes it difficult, if not impossible, without significant effort, to identify an address as a WPAR's address and on which host data processing system that WPAR may be executing. For example, this obscured information about the relationship between a host data processing system and the WPARs executing thereon may be important for performing maintenance operations, such as for applying software upgrades or patches.

Additionally, the network topology makes it difficult to determine which WPAR is associated with which network address. This difficulty arises because, theoretically, any available network address is assignable to any system, including a WPAR, without limitation. For example, a host IP address may be the first available address in a set of addresses, one WPAR executing on the host may acquire an address one hundred addresses away from the host address, and yet another WPAR may acquire the last address. A set of addresses is one or more addresses. Addresses scattered in this manner also make it difficult to identify which address is for a WPAR and which address is for a host.

The invention further recognizes that addressing WPARs using the present network aliasing method requires routing table entries. A routing table is information used by a network router device to route data packets to their destination. A routing table typically includes information about a part of a network path, such as information about the next hop, that leads to a destination address.

The invention recognizes that representing WPARs in a network using network aliasing can cause several problems, affecting the network performance. For example, consider a class C IP version 4 (IPv4) address—nnn.nnn.nnn.hhh where the <nnn> bits show network-id using three bytes, and hhh shows a host-id using one byte portion of the IPv4 address. Now consider a local area network housing twenty host data processing systems. Further, consider that each of the twenty host data processing systems is executing twenty WPARs. A router connected to network may route packets based on the network-id portion of the IPv4 address.

However, present system of addressing WPARs requires each global host to create at least twenty aliases—at least one per WPAR. Furthermore, a host must ensure that such aliases are distinguishable from one another and from other aliases in the network. Thus, as numerous aliases are created using the present system of addressing WPARs, the chances of address collision increase because only a limited number of unique aliases are possible using the one byte that is available in the IPv4 address to hold the host-id.

As another example, in IP version 6 (IPv6), a neighbor discovery protocol (NDP) procedure requires packet exchanges between a host and a router to construct a globally unique IP address. In the present system of addressing WPARs using IPv6, NDP and other procedures cause an increase in the packet exchanges as each host tries to create a unique alias for each of the several WPARs.

The illustrative embodiments used to describe the invention generally address and solve the above-described problems and other problems related to addressing WPARs. The illustrative embodiments provide a method for addressing a workload partition.

According to an embodiment of the invention, a WPAR space may be identifiable as a WPAR in a network and not as a data processing system at the same level as the host data processing system. An embodiment may further facilitate associating WPARs with their respective hosts. An embodiment may also allow associating specific addresses with specific WPARs by quick visual inspection of the address. An embodiment may also allow improved management of available unique addresses, thereby reducing address collision possibilities and improving network performance.

The illustrative embodiments are described with respect to certain data, data structures, file systems, fine names, directories, and paths only as examples. Such descriptions are not intended to be limiting on the invention. For example, an illustrative embodiment described with respect to IPv4 addressing convention may be implemented using IPv6 convention within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, Java® object, an Enterprise Java Bean (EJB®), a servlet, or an applet may be manifestations of an application with respect to which the invention may be implemented. (Java, EJB, and other Java related terminologies are registered trademarks of Sun Microsystems, Inc. in the United States and other countries.)

An illustrative embodiment may be implemented in hardware, software, or a combination thereof. An illustrative embodiment may further be implemented with respect to any type of network communication resource, such as a physical or virtual network interface card, that may be available in a given WPAR configuration.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular software tools and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
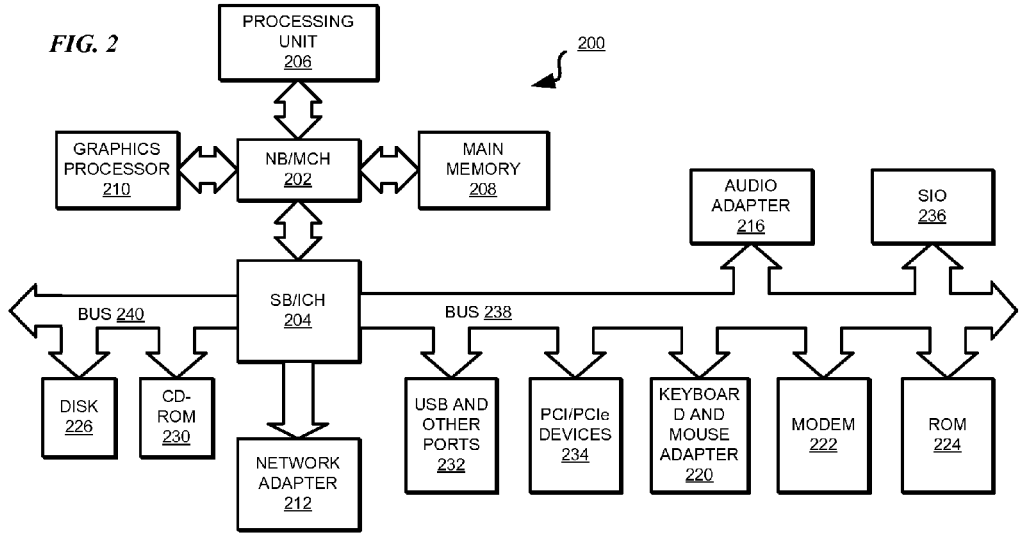
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include any number of WPARs, such as WPAR 105 and WPAR 107. WPAR 105 or 107 may each be a workload partition of any kind. Server 104 may further include software stack 109. Software stack 109 may be software usable for managing data network communications using one or more particular protocols. For example, in one embodiment, software stack 109 may be an IP stack—software to enable communication over an IP network.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
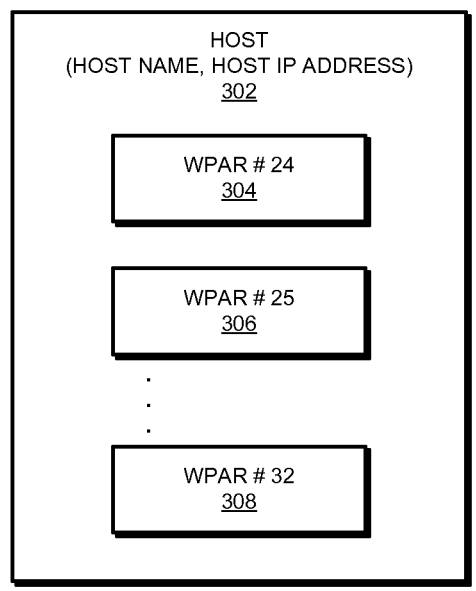
FIG. 3 depicts a block diagram of a WPAR configuration in accordance with an illustrative embodiment.

With reference to FIG. 3, this figure depicts a block diagram of a WPAR configuration in accordance with an illustrative embodiment. Host 302 may be any type of data processing system capable of executing a WPAR therein. For example, data processing system 302 may be a server data processing system, such as server 104 in FIG. 1.

Host 302 may be addressable using a hostname or a host IP address. Host 302 may include a set of WPARs. A set of WPARs is one or more WPARs. For example, host 302 may include WPARs 304, 306 and 308.

According to an embodiment, a WPAR may be uniquely identifiable in a host by an identifier. For example, WPAR 304 may be twenty fourth WPAR in host 302, and may be identified by number 24. In other words, host 302 includes only one WPAR, WPAR 304, that is identifiable as WPAR 24. Similarly, WPAR 306 may be WPAR 25, identified by identifier 25. WPAR 308 may be the thirty second WPAR in host 302, identified by number 32.

The numbers are used as WPAR identifiers only as examples for the clarity of the description. An implementation may use any alphanumeric or symbolic identifier in a similar manner within the scope of the invention. For example, an implementation may give WPAR 304 the identifier "app1", WPAR 306 the identifier "back-end", and WPAR 308 the identifier "/1" without departing the scope of the invention.

A WPAR identifier of choice has to be unique only within the corresponding host data processing system. In other words, two different host data processing systems may include WPARs that have identical identifiers within the scope of the invention.

Figure 4:
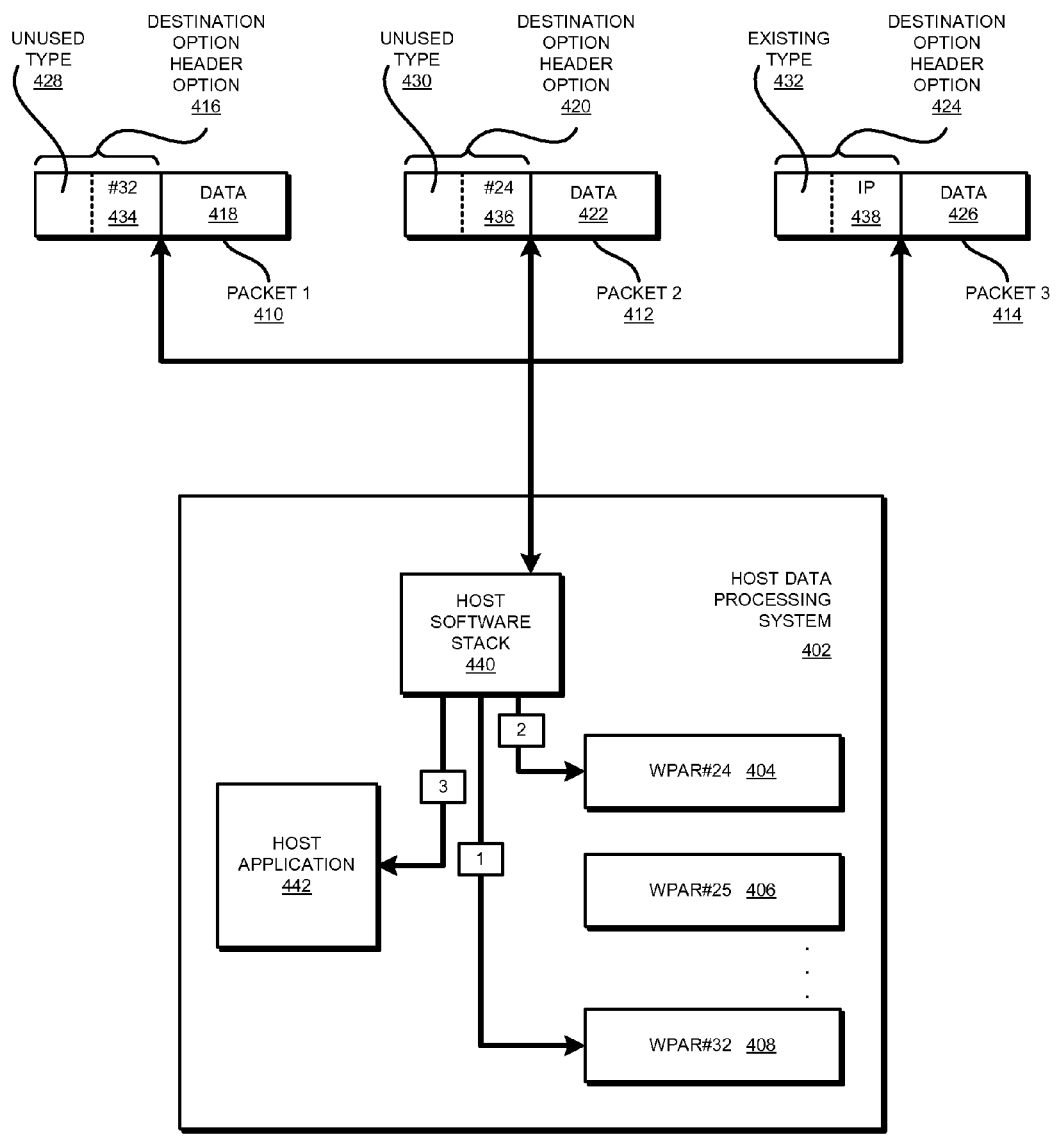
FIG. 4 depicts a block diagram of addressing a WPAR in accordance with an illustrative embodiment.

Any naming convention may be used for identifying WPARs as long as the naming convention can be successfully used in conjunction with a corresponding addressing protocol's naming convention. For example, a WPAR identifier may not invalidate an identifier that identifies the host but may be usable in conjunction with the host identifier in accordance with an embodiment. FIG. 4 further illustrates by example the addressing principle of the invention.

With reference to FIG. 4, this figure depicts a block diagram of addressing a WPAR in accordance with an illustrative embodiment. Host data processing system 402 may be similar to host 302 in FIG. 3. WPARs 404, 406, and 408 may be similar to WPARs 304, 306, and 308 respectively in FIG. 3.

According to the illustrative embodiments, a WPAR need not use network aliasing and acquire a unique address on a given network. A WPAR's address is constructed by combining the address associated with the host and an identifier associated with the WPAR. Such a WPAR address according to an embodiment is referred to as a combined address.

For example, if the host IPv4 address of host 402 were 192.253.253.4, address of WPAR 404, namely WPAR with identifier "24", according to an embodiment could be 192.253.253.4#24. The symbol "#" acts as a delimiter between the host address and the WPAR identifier and may be any symbol or character not of particular significance in a given protocol. For example, "#" does not have significance in IP specification. Present IP stacks and IP routers process only the IP address, to wit, 192.253.253.4 portion of the combined address, and the processing of that symbol and following text is left up to the destination data processing system.

Combined address according to an embodiment need not be stored in the form depicted. In other words, the form of the combined address, to wit, an IP address-delimiter-WPAR identifier, may be constructed from those available parts, the parts being available anywhere in a packet without limitation. For example, in one embodiment, an IP address, a delimiter, and a WPAR identifier may all be stored together in one data element of the packet. In another embodiment, the IP address, the delimiter, and the WPAR identifier may be stored in different data elements of the packet, such that the combined address can be logically constructed during any processing of the packet using those elements. Any operation described with respect to a combined address in this disclosure is performable using any embodiment of the combined address—whether actually combined or logically combinable.

Packets 410, 412, and 414 may be any unit of data transmission organized according to some protocol. Furthermore, any of packets 410, 412, and 414 may be a logical grouping of a set of packets that can be treated as one unit of data being communicated under a given protocol.

In the depicted example, and not as a limitation, packets 410, 412, and 414 are depicted as IP data packets. Packet 410 is labeled "packet 1", Packet 412 is labeled "packet 2", and Packet 414 is labeled "packet 3".

Each packet 410, 412, and 414 may further include a destination option header. A destination option header, may include one or more options. Various protocols or protocol customizations may specify differing structures and numbers for the destination option header and the options contained therein. For example, IPv4 and IPv6 provide that each option include three attributes—an option type, an option data length, and the option data. Several options are thus arranged and readable in a destination option header.

Packet 410 includes destination option header option 416 and payload data 418. Packet 412 includes destination option header option 420 and payload data 422. Packet 414 includes destination option header option 424 and payload data 426. Destination option header options 416, 420, and 424 may each be one option in a set of options in a destination option header according to a protocol. Packets 410-414 may include other options in their respective destination option headers (not shown). A set of options is one or more options. An option may include a set of attributes. A set of attributes is one or more attributes. An attribute may be data in any suitable form.

In the depicted example, destination option headers options 416, 420, and 424 are configured according to IP specification with unnecessary structures omitted for clarity. Accordingly, each of destination option header options 416, 420, and 424 includes a type attribute. Destination option header option 416 includes type attribute 428, destination option header option 420 includes type attribute 430, Destination option header option 424 includes type attribute 432.

A type attribute is an attribute that identifies a type of the destination option header option. Different types of destination option header options are usable for different purposes in data communication according to a protocol. Some values of the type attribute are reserved, special, or specified, for use for predetermined purposes.

In accordance with an embodiment, a value that is not reserved or specified for a predetermined purpose in IP specification is used to populate type attributes 428, 430, and 432. For example, destination option header options 416 and 420 may be of type "5" and destination option header option 424 may be of an existing type in one embodiment. Under certain circumstances, an implementation may be able to reuse a reserved type value within the scope of the invention.

An address attribute of an option may be another attribute in the set of attributes of a destination option header option. For example, an address attribute may be a data attribute of an option that holds an address value that is usable for reaching or addressing a destination of the packet. For example, in an IP destination option header, the address attribute of an option may hold an IP address, such as 192.253.253.4, or a WPAR identifier, such as "24".

In present implementation of IP specification, IP addresses are included in IP headers and not in destination option headers. Depiction of IP address as an option in a destination option header here is not provided to imply a deviation from the present IP standard but only to explain the operation of certain aspects of an embodiment. The embodiments can be implemented using a combination of IP headers, destination option headers, and other headers or equivalents thereof as may be suitable in IP communications or communications using other protocols.

Furthermore, an address attribute may be configured to hold additional indications related to the address value therein. For example, additional bits in an address attribute may further inform whether the address is of a source of the packet or a destination of the packet. Such details are omitted from the depiction to avoid obscuring the features of the illustrative embodiments. However, such alternative forms of the destination option header, options, and attributes will be apparent to those skilled in the art and are contemplated within the scope of the invention.

Address attributes of destination option header options 416, 420, and 424 may be configured to hold an address according to a protocol specification, a portion of a combined address, or a WPAR identifier. For example, address attribute 434 of destination option header option 416 may hold an identifier of WPAR 408 (WPAR number thirty two). Address attribute 436 of destination option header option 420 may hold an identifier of WPAR 404 (WPAR number twenty four). The address of host 402 may be contained in another option in destination option headers 416 and 420. Data of such two options when combined may yield the combined addresses of WPARs 408 and 404.

Address attribute 438 of destination option header option 424 may hold the address of host 402 in the protocol's specified addressing convention. Destination option header option 424 may be of existing type 432 used to identify such contents. Alternatively, the address of host 402 may be available in another part of packet 414, such as in an IP header (not shown).

When packets 410, 412, and 414 reach host 402, they are processed by host software stack 440. Host software stack 440 is a modified form of the software stack designed to enable data communication over a particular protocol. For example, host software stack 440 may be a modified form of an IP stack.

Some modifications in host software stack 440 enable host software stack 440 to parse a combination of the type attribute and the address attribute in the destination option header options of a packet presented to host software stack 440. For example, host software stack 440 may be able to recognize a delimiter in the address attribute and determine the nature of the text that follows the delimiter according to the value of the type attribute.

As another example, host software stack 440 may be able to read the type attribute in an option and be able to determine the nature and use of the address attribute in that option. For example, if the type attribute is set to a predetermined unused value, host software stack 440 may determine that the corresponding address attribute contains a WPAR's identifier.

In the example depicted in FIG. 4, host software stack 440 may receive packet 410 (packet 1) and determine that the address attribute includes the identifier of WPAR 408. Accordingly, host software stack 440 routes packet 410 (box labeled "1") to WPAR 408. Host software stack 440 may similarly receive packet 412 (packet 2) and determine that the address attribute includes the identifier of WPAR 404. Accordingly, host software stack 440 routes packet 412 (box labeled "2") to WPAR 404.

In one embodiment, host software stack 440 may also receive packet 414 (packet 3) and determine that the address attribute does not include a delimiter, such as "#", or any text following the delimiter, but the address of host 402. Accordingly, host software stack 440 routes packet 414 (box labeled "3") to host application 442 executing in host 402. In another embodiment, host software stack 440 may receive packet 414 (packet 3) and determine that the designated type of the option used for indicating a WPAR identifier is missing. Accordingly, host software stack 440 routes packet 414 (box labeled "3") to host application 442 executing in host 402.

In another embodiment, host software stack 440 may receive packet 414 (packet 3) and determine that the type of the option indicates the address of host 402. Accordingly, host software stack 440 routes packet 414 (box labeled "3") to host application 442 executing in host 402. In another embodiment, host software stack 440 may receive packet 414 (packet 3) and determine that the type of the option that indicates a WPAR identifier is missing and the address of host 402 should be located in the IP header, not the destination header. Accordingly, host software stack 440 routes packet 414 (box labeled "3") to host application 442 executing in host 402.

Thus, WPARs 404, 406, and 408 need not be assigned unique addresses in a manner similar to the address of host 402. The combined address associated with each of those WPARs is sufficient to identify them within host 402 and on the data network over which those WPARs communicate.

In one embodiment, the combined addresses can be incorporated into the destination option headers of the data packets destined for those WPARs. In another embodiment, the combined addresses can be generated from the attributes of one or more options in the destination option headers of the data packets destined for those WPARs. Modified host software stack 440 is able to route data traffic to appropriate WPARs by using the information in the destination option headers, IP headers, or a combination thereof, of the data packets.

When a modified host software stack, such as host software stack 440, prepares an outbound packet for a WPAR, the modified host software stack populates the address attribute and the type attribute of options in the destination option header of a resulting packet similarly. For example, a sender host of packet 1 (not shown) may include a host software stack similar to host software stack 440 (not shown). The sender host's software stack may populate values "5" and "#32" in type attribute 428 and address attribute 434 respectively, and "192.253.253.4" in the IP header of packet 1 (not shown), to cause the operation of FIG. 4 to occur as described.

Figure 5:
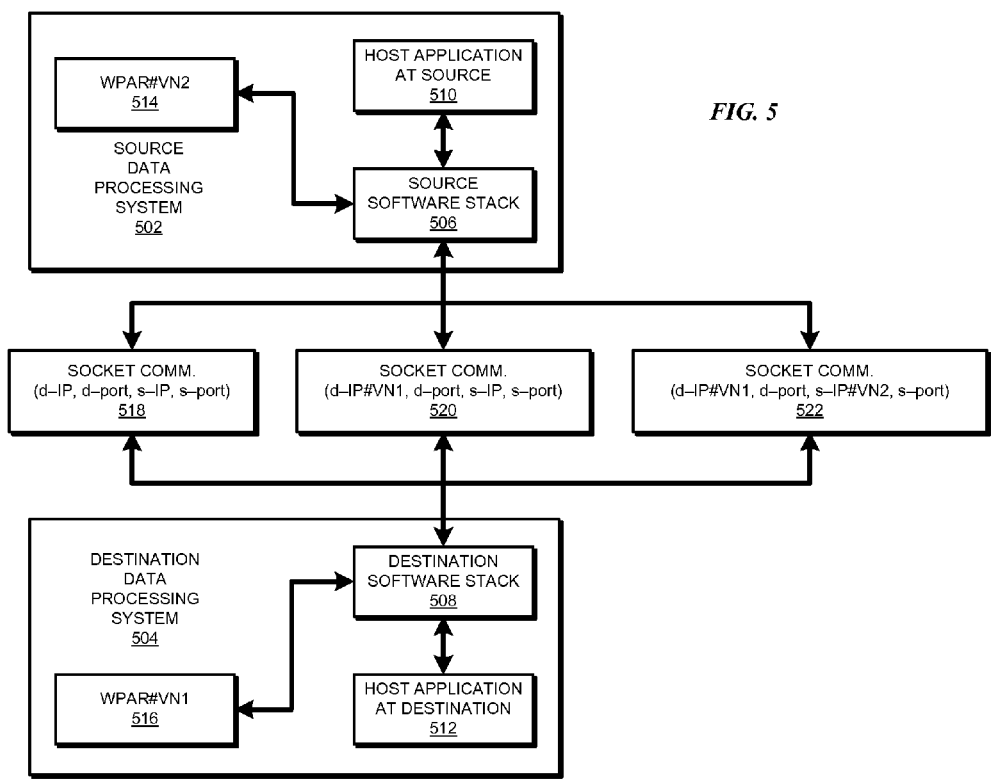
FIG. 5 depicts a block diagram of another configuration for addressing WPARs in accordance with an illustrative embodiment.

With reference to FIG. 5, this figure depicts a block diagram of another configuration for addressing WPARs in accordance with an illustrative embodiment. Source data processing system 502 and destination data processing system 504 may each be similar to host data processing system 402 in FIG. 4. Source software stack 506 and destination software stack 508 may be similar to host software stack 440 in FIG. 4.

Host application 510 at source, and host application 512 at destination may be any applications executing on the respective data processing systems. WPAR 514 may be a WPAR executing in source data processing system 502. WPAR 516 may be a WPAR executing in destination data processing system 504. As examples, WPAR 514 may be identified by identifier "VN2" and WPAR 516 may be identified by identifier "VN1".

Assume only as an example for illustration, source data processing system 502 and destination data processing system 504 are in communication using sockets. For example, WPAR 514 may communicate with host application 512 at destination, WPAR 516, or both. Similarly, host application 510 at source may communicate with host application 512 at destination, WPAR 516, or both.

A socket connection is defined using four parameters—a destination IP address, a destination port number, a source IP address, and a source port number. Sockets can be used for data communications using socket function calls that are predefined in sockets specification. For example, most function calls for establishing or using sockets use a set of parameters that may include a combination of the above four parameters. A set of parameters is zero or more parameters.

FIG. 5 depicts some alternatives for creating and using sockets by using the combined addresses according to an embodiment. FIG. 5 depicts that using the combined addresses in sockets communications does not require a change in the sockets specification, only using combined addresses where IP addresses would normally be used.

For example, socket communication 518 may be established between host application 510 at source and host application 512 at destination in the presently used manner. To wit, socket communication 518 may specify destination data processing system 504's IP address (d-IP), a port used at that destination IP address for the socket (d-port), source data processing system 502's IP address (s-IP), a port used at that source IP address for the socket (s-port).

As another example, socket communication 520 may be established between host application 510 at source and WPAR 516 (WPAR "VN1") at destination in accordance with an embodiment. To wit, socket communication 520 may specify WPAR 516's combined address (d-IP#VN1), a port used at that destination IP address for the socket (d-port), source data processing system 502's IP address (s-IP), a port used at that source IP address for the socket (s-port). Thus, a socket may be established using existing socket specification in combination with WPAR addressing according to an embodiment of the invention.

As another example, socket communication 522 may be established between WPAR 514 (WPAR "VN2") at source and WPAR 516 (WPAR "VN1") at destination in accordance with an embodiment. To wit, socket communication 522 may specify WPAR 516's combined address (d-IP#VN1), a port used at that destination IP address for the socket (d-port), WPAR 514's combined address (s-IP#VN2), a port used at that source IP address for the socket (s-port). Thus, a socket may be established using existing socket specification in combination with WPAR addressing according to an embodiment of the invention.

The example of socket based communication is only an example and is not intended to be an exhaustive list of possible types of communications using an illustrative embodiment. Other types of communications can be similarly established using an illustrative embodiment within the scope of the invention. Furthermore, the depicted examples of socket communications 518-522 are also not limiting on the invention. Other functions of socket-based communications can be invoked in a similar manner within the scope of the invention.

Figure 6:
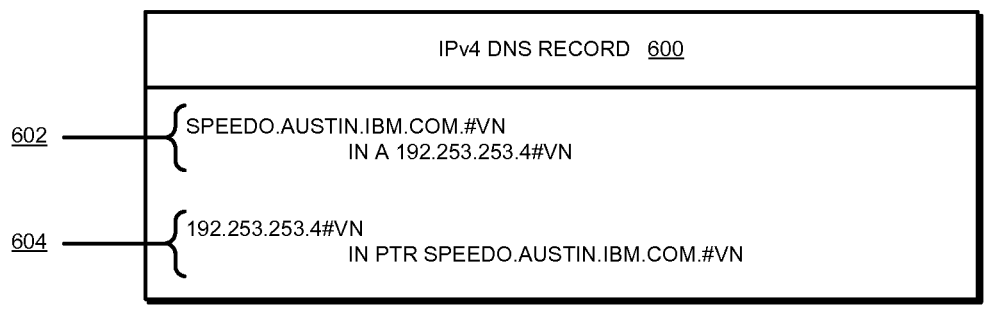
FIG. 6 depicts example records in IPv4 domain name system in accordance with an illustrative embodiment.

With reference to FIG. 6, this figure depicts example records in IPv4 domain name system in accordance with an illustrative embodiment. The domain name system (DNS) is a hierarchical naming system for computers, services, or any resource connected to the Internet or a private network. The DNS includes several types of records, some resolving a domain name to an IP address (the A record), some mapping an IP address to a domain name (the PTR record). Many other types of records can exist in the DNS for a unique network address.

A host data processing system or a WPAR can be reached by a formatted name (domain/sub-domain name) or address according to the IP specification. Presently, because each WPAR has a unique address, each WPAR has one or more records in the DNS similar to the host data processing system. For example, presently, a host data processing system's A and PTR records look similar to a WPAR's A and PTR records in the DNS.

According to an embodiment, a DNS record for a WPAR can be modified within the existing structure of the DNS for using a combined address for the WPAR. As an example, a host data processing system may have an IP address of 192.253.253.4 and be associated with the domain name "speedo.austin.ibm.com". A WPAR executing on that host data processing system may have an identifier "VN" and may be responsible for a specific section of the domain.

In accordance with an embodiment, the DNS A record for the WPAR may be modified to appear as A record 602. The DNS PTR record for the WPAR may be modified to appear as PTR record 604. Other records in the DNS, if applicable, can be similarly modified to refer to the combined address of the WPAR. The modified host software stack is already capable of performing the processing of the combined address. Modifying the DNS entries in this manner allows the combined address of the WPAR to be broadcast across the network for use by applications and systems that wish to communicate with the WPAR using the addressing of an embodiment.

Figure 7:
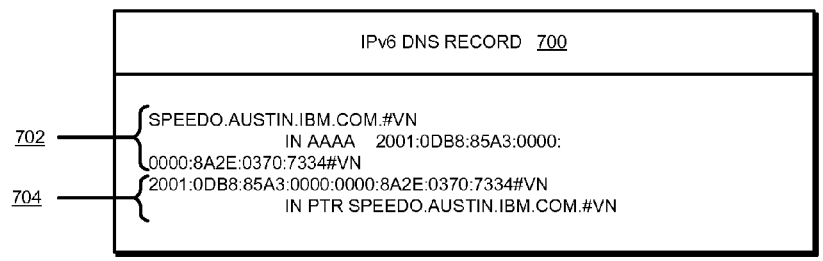
FIG. 7 depicts example records in IPv6 domain name system in accordance with an illustrative embodiment.

With reference to FIG. 7, this figure depicts example records in IPv6 domain name system in accordance with an illustrative embodiment. The PIv6 DNS includes several types of records, some resolving a domain name to an IPv6 address (the AAAA record), some mapping an IPv6 address to a domain name (the PTR record). Many other types of records can exist in the DNS for a unique network address.

A host data processing system or a WPAR can be reached by a formatted name (domain/sub-domain name) or address according to the IP specification. Presently, because each WPAR has a unique address, each WPAR has one or more records in the IPv6 DNS similar to the host data processing system. For example, presently, a host data processing system's AAAA and PTR records look similar to a WPAR's AAAA and PTR records in the IPv6 DNS.

According to an embodiment, an IPv6 DNS record for a WPAR can be modified within the existing structure of the IPv6 DNS for using a combined address for the WPAR. Using the same example as in FIG. 6, a host data processing system may have an IPv6 address of 2001:0db8:85a3:0000:0000:8a2e:0370:7334 and be associated with the domain name "speedo.austin.ibm.com". A WPAR executing on that host data processing system may have an identifier "VN" and may be responsible for a specific section of the domain.

In accordance with an embodiment, the IPv6 DNS AAAA record for the WPAR may be modified to appear as AAAA record 702. The IPv6 DNS PTR record for the WPAR may be modified to appear as PTR record 604. Other records in the IPv6 DNS, if applicable, can be similarly modified to refer to the combined address of the WPAR. The modified host software stack is already capable of performing the processing of the combined address. Modifying the IPv6 DNS entries in this manner allows the combined address of the WPAR to be broadcast across the network for use by applications and systems that wish to communicate with the WPAR using the addressing of an embodiment.

Figure 8:
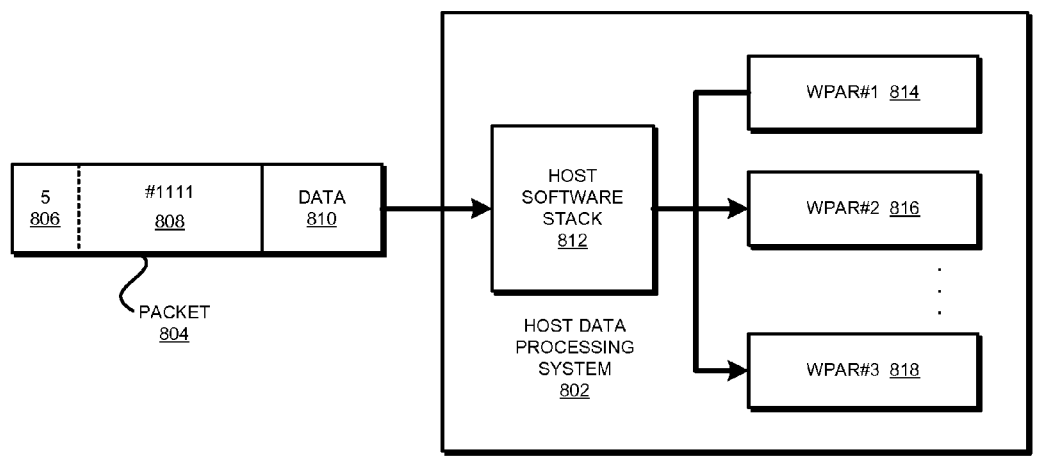
FIG. 8 depicts a block diagram of an example of reserving certain forms of combined addresses for predefined purposes in accordance with an illustrative embodiment.

With reference to FIG. 8, this figure depicts a block diagram of an example of reserving certain forms of combined addresses for predefined purposes in accordance with an illustrative embodiment. Host data processing system 802 may be similar to host data processing system 402 in FIG. 4 or 504 in FIG. 5. As an example, host data processing system 802 may have an IP address of "192.253.253.4".

Packet 804 may be one or more data packets configured according to a specific protocol. In the depicted example, packet 804 may be considered similar to packet 410 in FIG. 4. Packet 804 may include type attribute 806 and address attribute 808 in a destination option header option, and data 810 in the payload section. As an example, type attribute 806 may be set to a presently unused value, for example, "5", to indicate that the packet is addressed using combined addressing. Address attribute 808 may be set to a value of all 1's, such as "#1111". Host data processing system 802's address "192.253.253.4" may be available from an IP header associated with packet 804.

The text after the delimiter "#", to wit, "1111" may be a reserved identifier that may indicate, not an identifier of a WPAR, but an action or operation to be performed at host data processing system 802. Such identifiers are called "special" identifiers in IP specification.

For example, an identifier of all 1's may be reserved to indicate that packet 804 should be broadcast to all WPARs executing in host data processing system 802. Similarly, all 0's may indicate that the destination is the host itself, not a WPAR.

Any number and type of such reservations and corresponding predefined functions may be assigned to certain portions of the combined addresses. Furthermore, such reservations and corresponding actions can be configured in modified host software stack 812 or another component of host data processing system 802.

"1111" is depicted as being four bits in length only as an example. The length of address attribute is not a limitation on the invention. For example, in one embodiment, "11" may carry the same meaning as "11111111" in another embodiment, and "000000000000" may carry the same meaning as "0".

In one embodiment, host software stack 812 may receive packet 804 and detect the text "1111" in the combined address. Accordingly, host software stack 812 may execute or cause to execute the corresponding function, to wit, a broadcast of packet 804 to all WPARs, namely, WPARs 814, 816, and 818, that may be executing in host data processing system 802.

Figure 9:
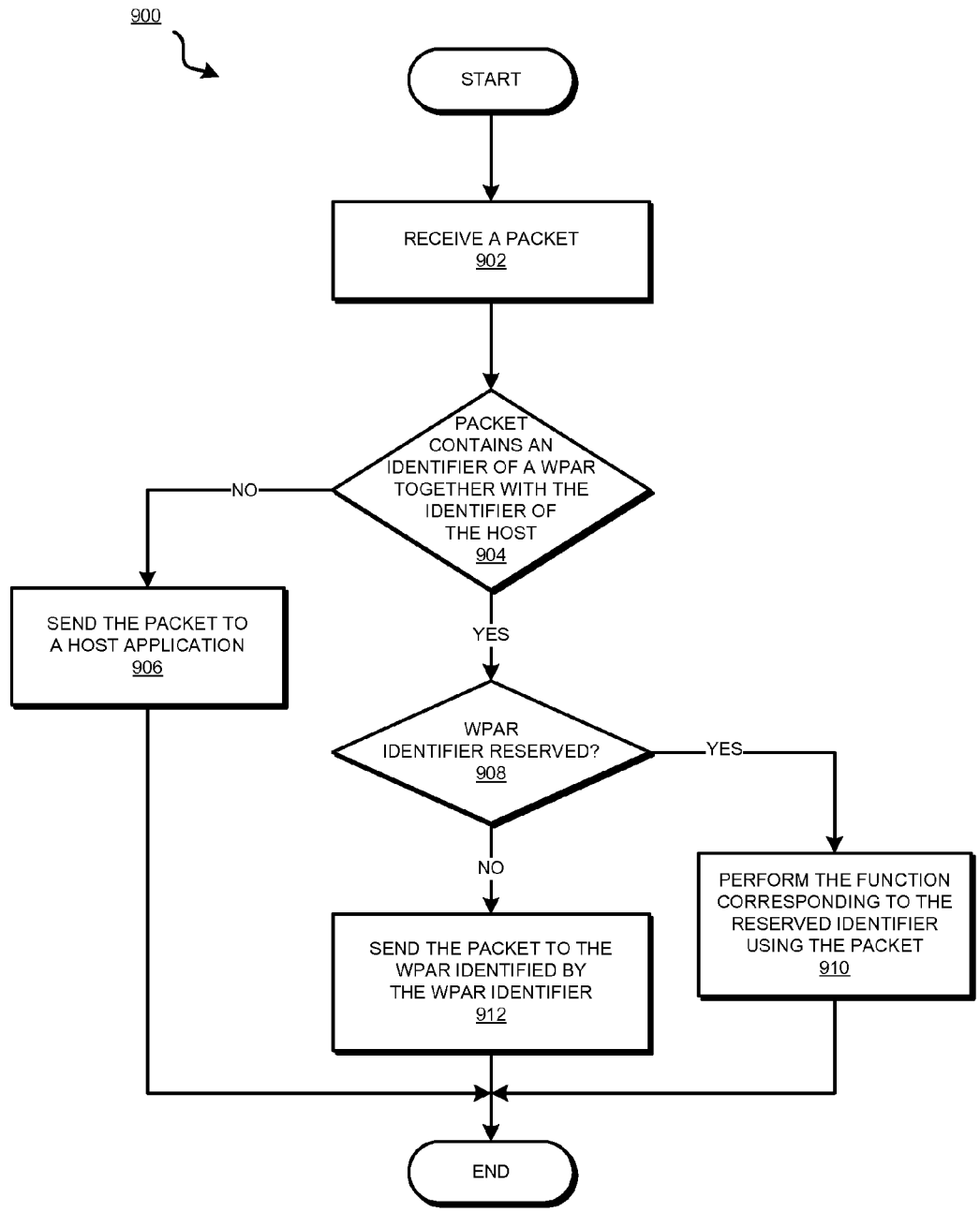
FIG. 9 depicts a flowchart of a process of addressing a WPAR using a combined address in accordance with an illustrative embodiment.

With reference to FIG. 9, this figure depicts a flowchart of a process of addressing a WPAR using a combined address in accordance with an illustrative embodiment. Process 900 may be implemented in a modified software stack, such as host software stack 812 in FIG. 8.

Process 900 begins by receiving a packet (step 902). Process 900 determines whether the packet contains an identifier of a WPAR together with the identifier of the host (step 904). For example, process 900 may determine whether a delimiter is included in the host address and whether any text follows the delimiter.

If the packet does not include a WPAR identifier ("No" path of step 904), process 900 deems the packet to be destined for an application executing in the host data processing system and not in a WPAR, and delivers the packet to the host application. Process 900 ends thereafter.

If the packet does include a WPAR identifier ("Yes" path of step 904), process 900 determines whether the WPAR identifier is reserved (step 908). If the WPAR identifier is reserved ("Yes" path of step 908), process 900 performs or causes to be performed using the packet, a function corresponding to the reserved identifier (step 910).

If the WPAR identifier is not reserved ("No" path of step 908), process 900 sends the packet to the WPAR identified by the WPAR identifier (step 912). Process 900 ends thereafter.

Figure 10:
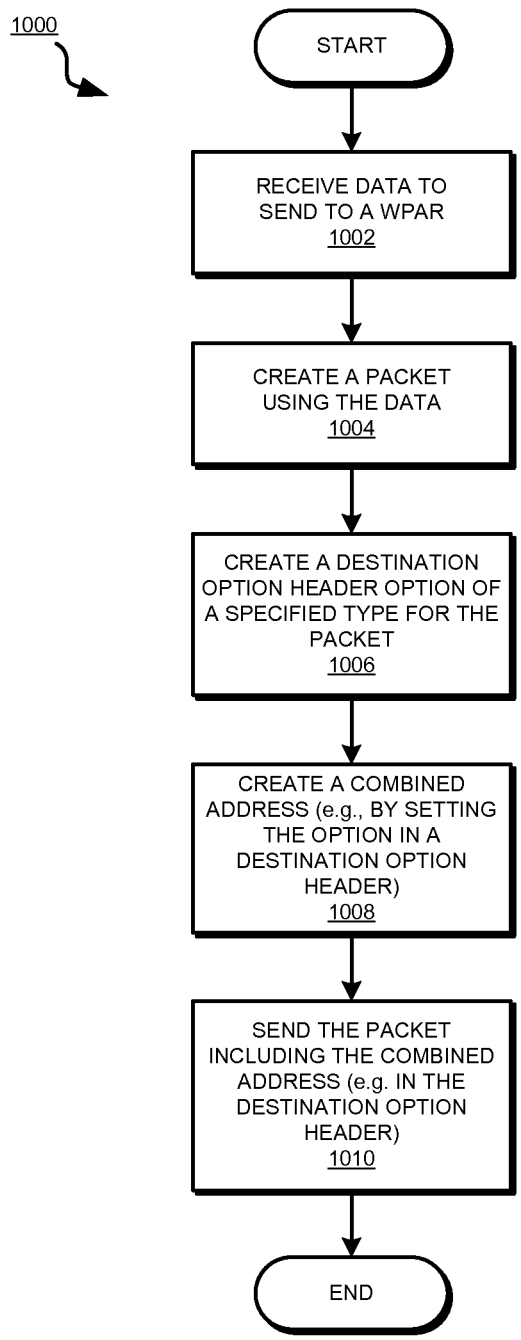
FIG. 10 depicts a flowchart of another process of addressing a WPAR using a combined address in accordance with an illustrative embodiment.

With reference to FIG. 10, this figure depicts a flowchart of another process of addressing a WPAR using a combined address in accordance with an illustrative embodiment. Process 1000 may be implemented in a modified software stack, such as host software stack 812 in FIG. 8.

Process 1000 begins by receiving data to send to a WPAR (step 1002). Process 1000 creates a packet using the data (step 1004). Process 1000 creates a destination option header option of a specified type for the packet (step 1006). For example, process 1000 may create a destination option header option using a presently unused type value, a proprietary value, or a presently used value for a mutually agreed alternate purpose.

Process 1000 creates a combined address (step 1008). For example, in one embodiment, step 1008 may create the combined address in the destination option header option's data attribute. In another embodiment, step 1008 may create the combined address by placing a WPAR identifier in an option in the destination option header and an IP address of the host in an IP header. In another example embodiment, the combined address may be created, placed, or distributed in an alternate part of the packet within the scope of the invention. The combined address may be created according to an embodiment described in this disclosure.

Process 1000 sends the packet including the combined address to the destination WPAR (step 1010). Process 1000 ends thereafter.

With reference to FIG. 11, this figure depicts a flowchart of another process of addressing a WPAR using a combined address in accordance with an illustrative embodiment. Process 1100 may be implemented in a modified software stack, such as host software stack 506 in FIG. 5.

Process 1100 begins by receiving data to send to a WPAR (step 1102). Process 1100 determines whether the data received is from a WPAR at the source (step 1104). If the data is from a source WPAR ("Yes" path of step 1104), process 1100 creates a source identifier by combining an identifier of the source host and an identifier of the source WPAR (step 1106). If the data is not from a source WPAR ("No" path of step 1104), process 1100 uses only the identifier of the source host as the source identifier (step 1108). Process 1100 creates a destination identifier by combining an identifier of the destination host and an identifier of the destination WPAR (step 1110). The combining in steps 1106 and 1110 may place the WPAR identifier and the host identifier in different locations within the scope of the invention.

Process 1100 communicates the data using the source identifier and the destination identifier (step 1112). Process 1100 ends thereafter.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method is provided in the illustrative embodiments for addressing a workload partition. Using the embodiments of the invention, a WPAR can be addressed without using network aliasing.

An embodiment may allow existing routers and routing tables to remain unaffected by the deployment of the embodiment. An embodiment can be implemented only by modifying an existing software stack to recognize and process combined addresses.

The combined addresses according to an embodiment closely resemble the conception structure of WPAR partitions executing in a global space. WPAR specific multicast, broadcast, and other functions can be implemented using an embodiment by using reserved identifiers in the combined addresses.

An embodiment may make license management easier as compared to the current license management process in WPARs. Because all WPARs in a host data processing system are associate with a common IP address, licensing software to that IP address may prevent license manager from denying a license to a WPAR.

The embodiments are generally described with the intention to conform to existing protocol specifications. Any feature contrary to an existing protocol specification is described in that manner only to illustrate possible alternatives and implementation choices, or for accommodating aspects of some protocols that may be contradictory with similar aspects of other protocols. For example, according to present IP specification, source IP address and destination IP address are generally carried in the main IP header, and not in destination option header. Depiction of an IP address in an option in a destination option header is to allow an embodiment to be implemented in alternative manner while recognizing that the embodiment can be implemented in conformance with the existing IP specification within the scope of the invention. As another example, even though not shown in an embodiment, a WPAR identifier for a source and a WPAR identifier for a destination can be populated in one or more options in a destination option header within the scope of the invention.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for addressing a workload partition (WPAR), the computer implemented method comprising:
    receiving, from a second data processing system, a packet of data at a software stack executing in a data processing system, the packet being directed to the WPAR executing in the data processing system, the packet including a combined address, wherein the combined address combines a first part to identify the data processing system to the second data processing system over a data network and a second part to identify the WPAR executing in the data processing system, wherein the first part and the second part are separated in the combined address using a delimiter character;
    determining whether the combined address includes an identifier that is reserved, wherein when a predetermined function is to be performed at the data processing system, the combined address in the packet stores the identifier that is reserved, the identifier corresponding to the function;
    using the identifier to identify the WPAR in the data processing system when the identifier is not reserved; and
    sending the packet to the WPAR.

2. The computer implemented method of claim 1, wherein the software stack is an application configured to enable data communication using a protocol of the packet, and wherein the software stack is modified to detect, recognize, and process the combined address for routing the packet to the WPAR.

3. The computer implemented method of claim 1, wherein the first part comprises an identifier associated with the data processing system, the first part being usable to communicate with the data processing system over the data network, and the second part comprises an identifier associated with the WPAR.

4. The computer implemented method of claim 3, wherein the combined address further includes a delimiter, wherein the delimiter separates the identifier associated with the data processing system from the identifier associated with the WPAR.

5. The computer implemented method of claim 4, wherein the delimiter does not have a predefined significance in a protocol of the packet and wherein the combined address is not stored in the combined form but is logically formed by combining the identifier associated with the data processing system located in a first portion of the packet and the identifier associated with the WPAR located in a second portion of the packet.

6. The computer implemented method of claim 1, further comprising:
identifying a presence of the combined address by checking an attribute in the packet.

7. The computer implemented method of claim 6, wherein the attribute is a type of a destination option header option of the packet, and wherein a value of the attribute is unused in a protocol of the packet.

8. The computer implemented method of claim 6, wherein the attribute is a type of a destination option header option of the packet, and wherein a value of the attribute is defined for a particular use in a protocol of the packet but is repurposed for identifying the presence of the combined address.

9. The computer implemented method of claim 1, further comprising:
performing a function corresponding to the identifier if the identifier is reserved.

10. The computer implemented method of claim 9, wherein the function is broadcasting the packet to all WPARs executing in the data processing system.

11. The computer implemented method of claim 1, wherein when the packet does not include a combined address, further comprising:
processing the packet according to a protocol of the packet.

12. The computer implemented method of claim 1, wherein a determination that the packet does not include a combined address is made by determining that the packet does not include a type attribute whose value indicates a presence of an identifier usable to identify the WPAR.

13. The computer implemented method of claim 12, further comprising:
placing a part of the combined address in a destination option header of the packet; and
setting a type attribute to a value, the value causing a software stack at the second data processing system to discover the part of the combined address and route the packet to the WPAR.

14. A computer implemented method for addressing a workload partition (WPAR), the computer implemented method comprising:
receiving data at a software stack executing in a first data processing system;
creating a packet using the data, the packet being directed to the WPAR executing in a second data processing system;
creating a combined address to include in the packet, wherein the combined address combines a first part to identify the second data processing system over a data network from the data processing system and a second part to identify the WPAR executing in the second data processing system, and wherein the first part and the second part are separated in the combined address using a delimited character; determining whether a predetermined function is to be performed at the second data processing system; forming, responsive to the determining being affirmative, the combined address by storing an identifier associated with the data processing system and a reserved identifier corresponding to the function in the packet; and
sending the packet to the WPAR.

15. The computer implemented method of claim 14, wherein the first part comprises an identifier associated with the second data processing system and the second part comprises an identifier associated with the WPAR, the first part being usable to communicate with the second data processing system over the data network and wherein the identifier associated with the second data processing system and the identifier associated with the WPAR are located in different portions of the packet.

* * * * *